Figure 1:
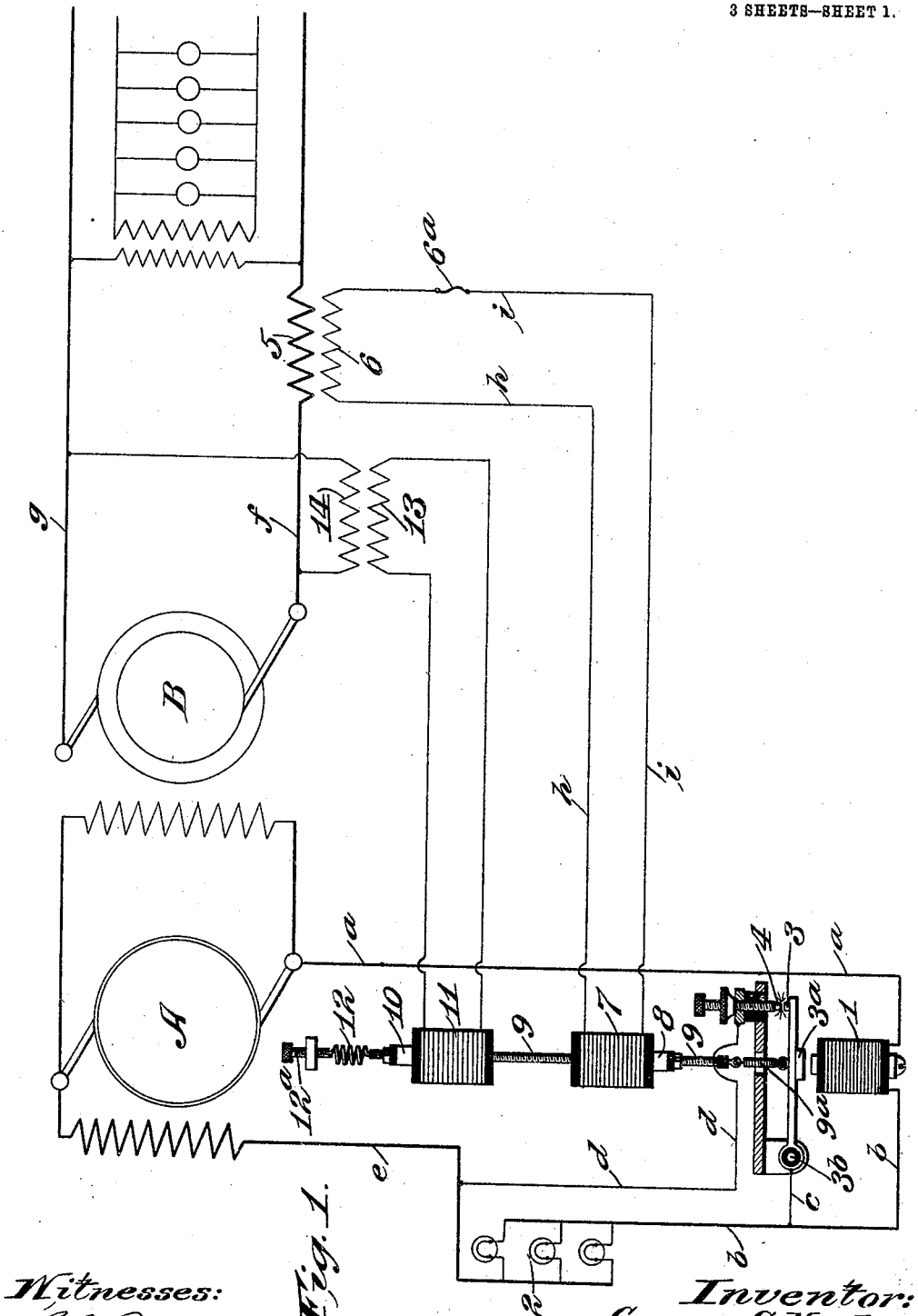

No. 838,800. PATENTED DEC. 18, 1906.
G. S. NEELEY.
AUTOMATIC VOLTAGE REGULATOR FOR DYNAMOS.
APPLICATION FILED JULY 31, 1905.

3 SHEETS—SHEET 1.

Witnesses:
G. A. Pennington
B. F. Funk

Inventor:
George S. Neeley,
by Bakewell & Cornwall
Attys.

No. 838,800. PATENTED DEC. 18, 1906.
G. S. NEELEY.
AUTOMATIC VOLTAGE REGULATOR FOR DYNAMOS.
APPLICATION FILED JULY 31, 1905.
3 SHEETS—SHEET 2.
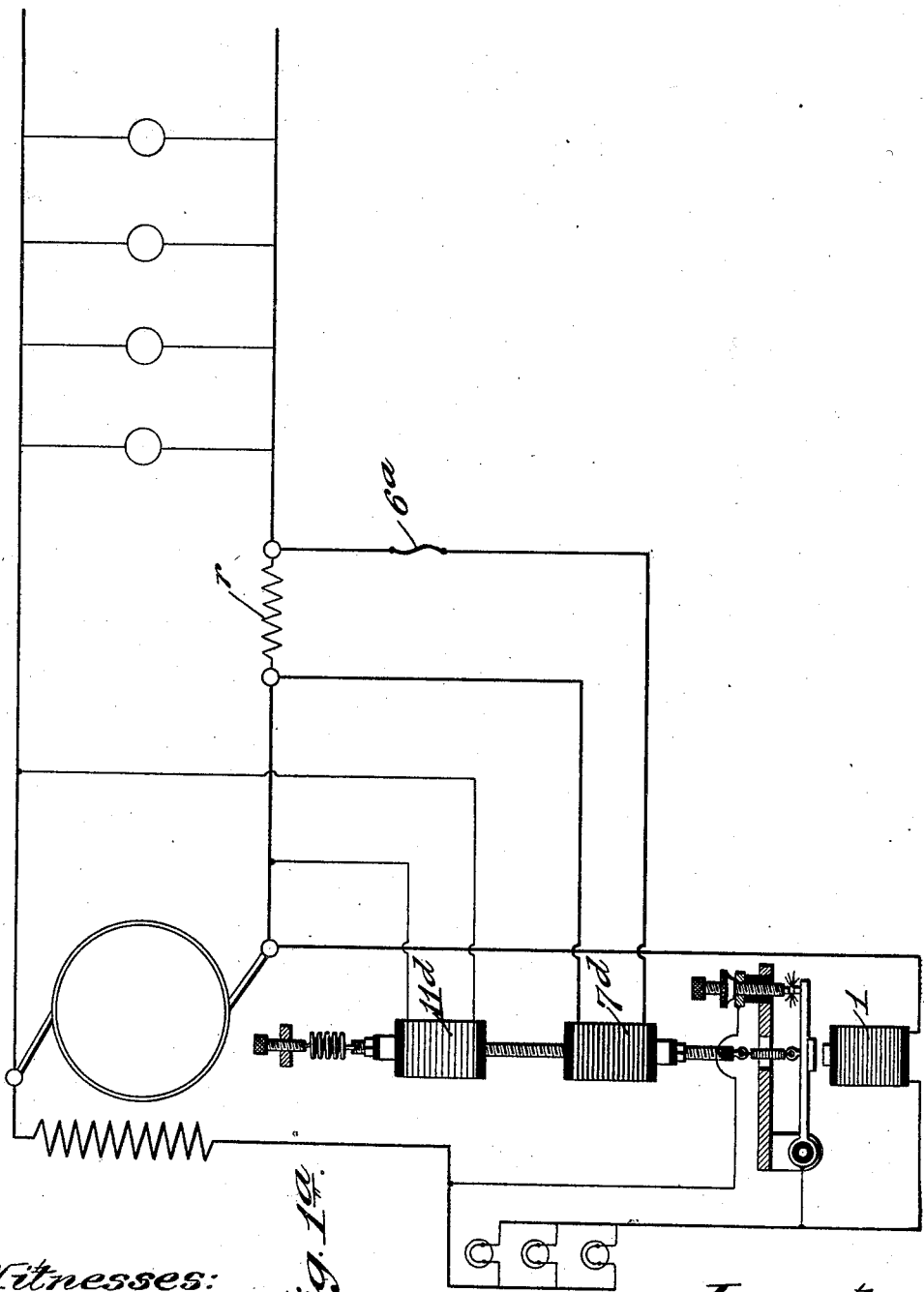
Fig. 1ª.
Witnesses:
G. A. Pennington
B. J. Funk
Inventor:
George S. Neeley,
by Bakewell & Cornwall
Attys.

No. 838,800. PATENTED DEC. 18, 1906.
G. S. NEELEY.
AUTOMATIC VOLTAGE REGULATOR FOR DYNAMOS.
APPLICATION FILED JULY 31, 1905.
3 SHEETS—SHEET 3.
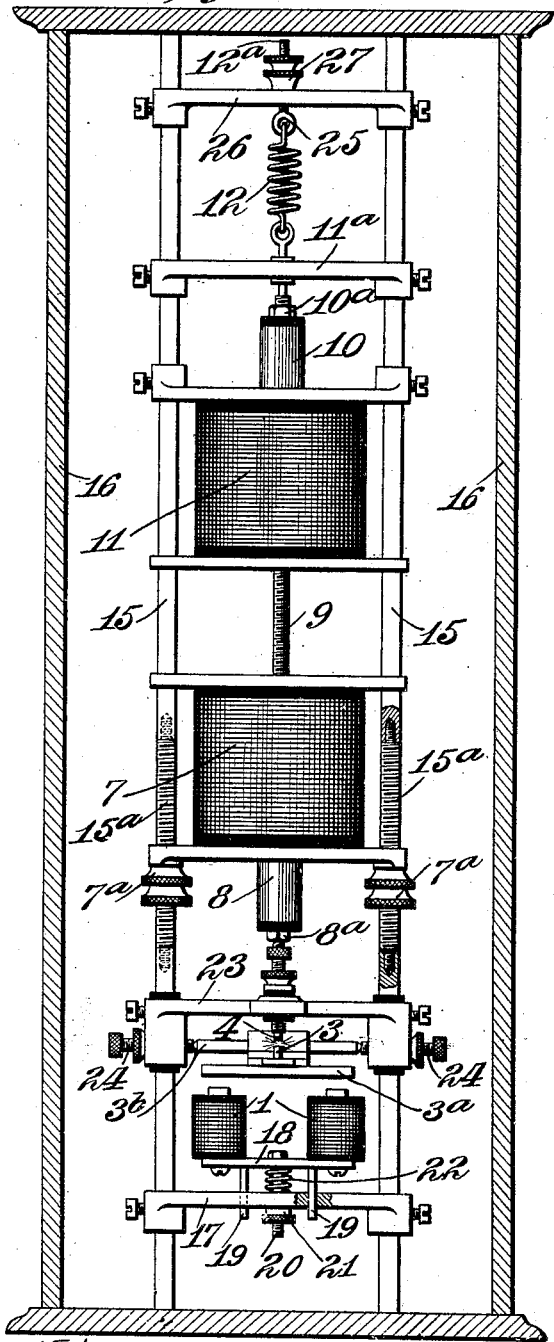
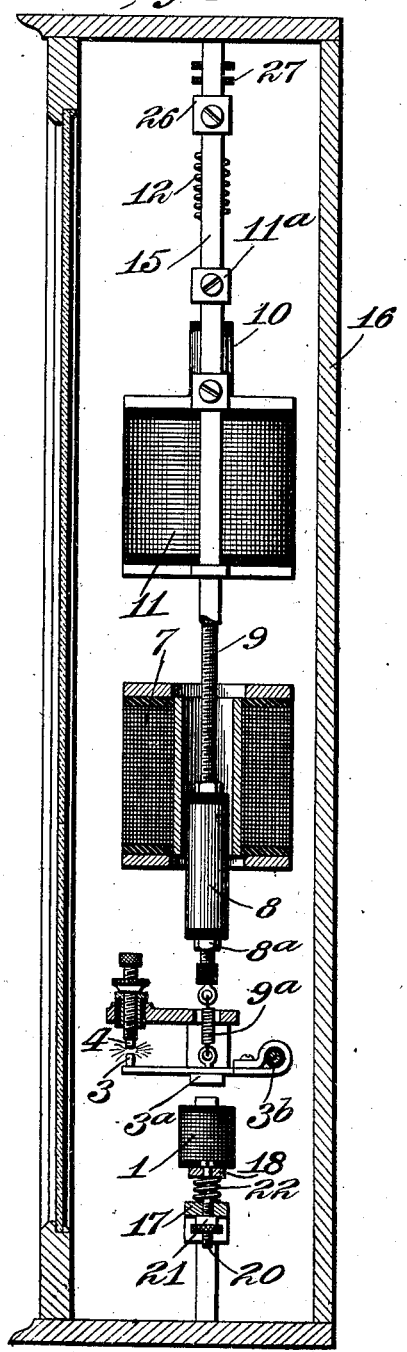
Witnesses:
G. A. Pennington
B. F. Fink
Inventor:
George S. Neeley,
by Bakewell & Cornwall
Attys.

UNITED STATES PATENT OFFICE.

GEORGE S. NEELEY, OF ST. LOUIS, MISSOURI.

AUTOMATIC VOLTAGE-REGULATOR FOR DYNAMOS.

No. 838,800.　　　　　Specification of Letters Patent.　　　　Patented Dec. 18, 1906.

Application filed July 31, 1905. Serial No. 271,980.

*To all whom it may concern:*

Be it known that I, GEORGE S. NEELEY, a citizen of the United States, residing at St. Louis, Missouri, have invented a certain new and useful Improvement in Automatic Voltage-Regulators for Dynamos, of which the following is a full, clear, and exact description, such as will enable others skilled in the art to which it appertains to make and use the same, reference being had to the accompanying drawings, forming part of this specification, in which—

Figure 1 is a diagrammatic view illustrating an alternating-current system in which my improved apparatus for regulating the fields of dynamos is used. Fig. 1ᵃ is a diagrammatic view illustrating my improved apparatus in a system having a self-exciting dynamo. Fig. 2 is a front elevational view of said apparatus, and Fig. 3 is a vertical sectional view of the same.

This invention relates to a new and useful improvement in means for regulating the fields of direct and alternating current dynamos, the object being to maintain a constant voltage in the work circuit or system by a simple arrangement of magnetically-controlled resistances and by a minimum expenditure of energy.

This present application is a continuation of applications Nos. 228,728 and 235,612 filed by me October 17, 1904, and December 5, 1904, respectively.

In the drawings I have shown an apparatus for carrying my invention into practice, the same consisting of a variable resistance in the field-circuit of the generator in one instance and in the field of the exciter in the other instance, which is primarily operated by two magnets. One of these magnets is controlled entirely by the variation of the intensity of the current supplied to the work circuit or system or such part of it as it may be found necessary to use. The other magnet is controlled by the intensity of the shunt-field-exciting current when regulating the field of a direct-current dynamo or by the exciter-field current, if regulating an alternating dynamo and is arranged in opposition to the first-mentioned magnet. The advantages of having these magnets controlled from these sources are many, among which may be mentioned the fact that there is no current wasted by the magnets, the regular current supplied to the system being made to do half the work of operating the field resistance, the other magnet doing the other half of the work of operating the field resistance through energy derived from the regular shunt-field-exciting current of either the working dynamo or its exciter. Thus means are provided for operating two powerful electromagnets which are energized from sources which vary in a ratio that will change the field resistance at the correct instant to prevent voltage fluctuation. I also provide a suitable resistance, preferably of carbon, in the shunt-field circuit of the exciter or in the shunt-field circuit of the working dynamo, if self-exciting, and for convenience of connecting and disconnecting this resistance it is preferably in the form of a specialized type of incandescent lamp to suit special requirements. This resistance is capable of carrying about eighty per cent. of the shunt-field current when heated to a state of incandescence. By using this special carbon resistance it is found that there is a diminution of its retarding action as its temperature rises, which is a very desirable feature, as it serves to relieve the contacts which constitute the variable resistance as the load and voltage of the dynamo increases. Around this carbon resistance is maintained an electric arc the length of which is varied and controlled by the magnets, one of which is in turn directly controlled by the intensity of the current supplied to the system and the other by the intensity of the current supplied to the shunt-field of the dynamo or that of the exciter when connected to regulate the voltage of alternating-current dynamos. I also make use of a mechanically-yielding means, preferably a spring, the tension of which is added to the magnet controlled by the intensity of the current supplied to the system. This affords means for conveniently adjusting the regulator initially to any normal voltage. I also employ a third electromagnet energized by the voltage of the current supplied to the system, whereby my regulator will automatically make compensation in the field resistance for decreased or increased speeds, thereby keeping the voltage of the dynamo and the system constant regardless of ordinary speed changes.

In the drawings, (see Fig. 1,) the exciter-field circuit passes through wire *a* to a magnet 1 and thence through wire *b* in the one instance to a resistance 2 and in the other instance through wire *c* to a movable contact 3, forming one terminal of a local circuit about the resistance 2. This movable contact 3 carries an armature 3$^a$, which is pivotally mounted at 3$^b$ in a position to be attracted by the magnet 1. Contact 3 preferably coöperates with a corresponding stationarily-mounted contact 4, from which leads a wire *d* back to the return-wire *e* of the exciter-field circuit.

When the exciter is in operation, it will be obvious that its field-current will be regulated in two ways by the arc formed between the contacts 3 and 4, which constitutes a variable resistance, the increment in which will cause the current to flow through the constant resistance 2. Thus conjunctively the variable resistance and the said carbon resistance 2 regulate the field-current of the exciter and directly control the field-current of the alternating-current generator B.

*g* and *f* indicate the main-line wires of the working circuit or system leading from and to the brushes of the generator B.

5 indicates the primary coil of a series or current transformer, from the terminals of the secondary winding 6 of which lead wires *h* and *i* to and from the coil of a solenoid-magnet 7, whose core 8 is connected by a rod 9 to the movable contact 3.

A yielding connection, preferably in the form of a spring 9$^a$, is interposed between the rod 9 and movable contact 3 for the purpose of absorbing the vibration of the rod due to the alternating effect produced in the magnet 7 when my apparatus is used in an alternating-current system. This spring cushions the vibration of rod 9 and prevents the transmission of said vibrations to the movable contact 3. Spring 9$^a$ is not necessary where my apparatus is used in a direct-current system. The magnet 7 is placed in opposition to the magnet 1 and tends to close the local circuit around the resistance 2 in opposition to the magnet 1, which tends to keep said circuit open and increase the variable resistance, which variable resistance (as well as the resistance 2) directly influences the strength of magnet 1 as well as the current strength of the exciter-field.

Rod 9, which connects the core 8 with the movable contact 3, extends through the magnet 7 and carries at its opposite end a solenoid core or armature 10, arranged in a magnet 11. A spring 12 is connected to rod 9 and its carried core 10, its tension being initially adjusted by screw-eye 12$^a$ and nut 27 and is exerted to close the contacts 3 and 4, assist the pull of the solenoid 7, and resist the counter-magnetic action resulting from the force of the solenoid 11 and magnet 1. This solenoid-magnet 11 is energized by the voltage of the current supplied to the system and assists in making compensation in the field resistance when variations occur in the voltage resulting from fluctuations in the speed and also assists in the regulation of the movable contact 3 when the voltage is increased or decreased from natural causes—as, for instance, when the current in the working circuit is increased or decreased. This solenoid-magnet 11, which heretofore I have referred to as "a third electromagnet," is preferably in the circuit of the secondary winding 13, whose primary 14 is across the lighting or work system.

In operation the variable resistance in the form of an arc between the contacts 3 and 4 in the local field-circuit of the exciter around the resistance 2 is under the control of the relatively powerful magnets 1 and 7. The magnet 7 is energized by the full intensity of the current supplied to the system or such part of it as it may be found necessary to use, the series or current transformer furnishing the means whereby any proportional part of the current of the working circuit may be utilized and also as a means for reducing the usual high voltage. The magnet 1 is energized by the intensity of the shunt-field-exciting current and is mechanically and magnetically in opposition to the magnet 7. Thus there is no extra current wasted by the magnets, as the regular current supplied to the system is made to do half the work of operating the field resistance, the other half being done by the magnet 1 through energy derived from the regular shunt-field-exciting current. In this way the magnets are operated from sources of power that vary in a ratio that will change the field resistance at the correct instant to prevent voltage fluctuation. The third magnet 11 is energized by the voltage supplied to the system and will thus automatically compensate for changes of speed and keep the voltage of the dynamo and the system constant regardless of ordinary speed changes. If a load is thrown on the dynamo B, it will increase the intensity of the current flowing in the main-line wires *f* and *g* and the series transformer 5 6. The intensity of this current increases the magnetic attraction of magnet 7 for its core 8. This results in moving the contact 3 closer to the contact 4 and reduces the resistance in the field-circuit of the exciter A, which results in an increased field flux of the dynamo B. Magnet 11, by being weakened, will offer less resistance to the spring 12, and consequently the spring 12 assists in moving the contact 3 toward the contact 4, because the tension of said spring continues after adjustment, and the force exerted by the magnet 11 in an opposite direction depends upon the strength of the voltage of the work system. If the load on the dynamo is increased, the voltage will be slightly decreased, and this operates to decrease the force of the magnet 11 and increase the force of the magnet 7.

When the force of the potential-magnet 11 is reduced, the spring 12 assists the action of magnet 7 in moving contact 3 closer to the contact 4, thus cutting down the variable resistance. The amount of assistance gained at that instant by the spring 12 is proportioned to the loss of force in magnet 11, because when the voltage is at normal the magnet 11 acts as a counterpoise for the spring 12. The actions of the spring 12 and the magnet 11 are reversed when the dynamo is under full load and the load begins to be thrown off. In such event the force of magnet 11 becomes the stronger, due to the slightly-increased voltage, and thus operates to assist the magnet 1 in widening the arc between the contacts 3 and 4, increasing the resistance to the exciting-current to compensate for the decreased load. If the dynamo is under full load and normal voltage and some or all of the load is thrown off of the work circuit, it will instantly result in the withdrawal of some or all of the force of the magnet 7, thus allowing the force of the magnet 1 to preponderate in the regulation of the contact 3 and cause the arc to be widened until the field-current of the exciter, through the magnet 1, finds a new point of magnetic equilibrium with the force of the magnet 7 in the work-circuit of the alternating dynamo B. In case of total disability of the magnets 7 and 11 the system will not be rendered inoperative, but only non-automatic, and may be operated by manual adjustment of the spring 12 for each increase or decrease of the load on the dynamo B.

If the dynamo B and the exciter A be driven by the same motive force, my regulator will compensate for twenty-five per cent. speed variation in the motive force, as follows: If the speed and voltage of the dynamo B is regulated for a given normal, a decrease of speed acts to decrease the voltage and also acts to decrease the intensity of the exciting-current by reducing the speed of the exciter. As the opposing forces of the magnet 11 and the spring 12 are equal at normal voltage and speed, a decrease of speed will decrease the voltage, and consequently the force of the magnet 11. The spring 12 will then act automatically to pull the contact 3 toward the contact 4, thus reducing the resistance in the field of the exciter as fast as the speed falls off. If the speed exceeds normal, it will also increase the voltage of the dynamo B above normal, and consequently the extra force of magnet 11 will automatically move the contact 3 farther away from the contact 4. An increase in speed also increases the field-current of the exciter, which increases the strength of the magnet 1 and results in an increase in the resistance in the field-circuit of the exciter A as fast as the speed increases.

In Fig. 1 I have shown an alternating-current dynamo, this form of separately-excited generator being the most common one met with in practice, and in order to avoid bringing the usual high-voltage current into contact with the regulator parts I have shown a series transformer in the working circuit and a constant-potential transformer across the working circuit, it being understood in the art that these devices give a secondary current and voltage exactly proportional to the primary current. Otherwise but for the danger from handling the high voltage the main line forming the working circuit might just as well pass around the solenoid-magnet 7 before being connected to the various translating devices. This is also true of the potential-coil or the solenoid that receives its energy from the voltage of the working circuit.

In Fig. 1$^a$ I have shown my improved apparatus arranged in a system wherein the dynamo is self-exciting. In this form the operation is precisely the same as that hereinbefore described with reference to the alternating-current system with the exception that the series transformer and the potential-transformer are of course unnecessary, the series transformer being replaced by a resistance marked $r$ in the work-circuit, which shunts a current proportional to the current in the work-circuit through the solenoid-magnet $7^d$. The potential-magnet $11^d$ is energized by the voltage of the work-circuit, it being connected across the main-line wires of the work-circuit.

$6^a$ is a fuse in the secondary circuit derived from the primary in series with the main-line or work-circuit. This fuse is designed to carry current up to the working capacity to which the apparatus is initially set, and should this fuse be blown the solenoid 7 would be thrown out of service. The force of the magnet 1 being left undisturbed would then preponderate and increase the variable resistance, thus throwing the full strength of the resistance 2 in the field-circuit of the exciter, which would effectively prevent the exciter-field current from rising above eighty per cent. of its minimum normal intensity.

In order to mount my improved apparatus in an inclosing case and provide for adjusting the position of the parts relative to each other and as a means for properly adjusting the magnets to suit the conditions of systems as ordinarily found in practice, I arrange two vertical guide-rods 15 in a box or casing 16, preferably having a glass front. On the vertical guide-rods 15 is arranged a sliding bar 17, held in adjustable position by means of set-screws engaging the guide-rods.

18 indicates a guide-yoke connecting the cores of magnets 1 and from which depend guide-rods 19, passing through openings in the bar 17. A threaded rod 20 is connected with said yoke and coöperates with the nut 21, impinging against the under side of the bar 17. A spring 22 is interposed between the yoke and the top of the bar 17. By this construction magnets 1 may be adjusted with respect to the armature $3^a$, so as to regulate the air-gap between said magnets and said armature, which action also regulates the effective force of the magnet 1, need for such adjustments depending upon the pull of the magnets, which must be initially adjusted for different voltages and current frequency.

23 indicates a bar also adjustably mounted, preferably, by means of set-screws on the vertical guide-rods 15, said bar carrying a stationary contact 4, preferably insulated therefrom, in line with the movable contact 3. This movable contact 3 is arranged on a pivot-rod $3^b$, having pointed bearing ends seated in sockets in the ends of screws 24, passing through rearwardly-extending lugs, preferably integral with the bar 23. Bar 23 is provided with an opening through which the solenoid-rod 9 passes, which is common to all the magnets or solenoids, said rod being connected to the movable contact 3, as shown. Rod 9 is preferably threaded for the greater part of its length, so that the solenoid-cores 8 and 10 may be adjusted thereon by means of nuts $8^a$ and $10^a$.

Solenoid-magnet 7 is adjustably mounted on the guide-rods 15 by means of nuts $7^a$, coöperating with threaded portions $15^a$ of said guide-rods, said nuts impinging against perforated ears or lugs extending from said magnet. Solenoid-magnet 11 is also provided with perforated lugs or ears, through which the guide-rods 15 pass, said lugs or ears having screws for adjusting said solenoid-magnet in position. Above this solenoid-magnet there is a guide-bar $11^a$, having an opening for the passage of the upper end of rod 9, which is of hard steel and of reduced diameter, said guide-bar forming a stop to limit the downward movement of said rod. The upper end of rod 9 is provided with an eye in which is connected the spring 12, the opposite end of said spring being connected to a screw-eye 25, which has a swivel connection and passes through a cross-bar 26, adjustably mounted on the guide-rods 15. Nuts 27 engage the threaded portion of the screw-eye and provide means for regulating the tension of the spring 12.

It will be noticed that the magnets which I employ in my improved regulating apparatus and system are energized by electric currents and are therefore artificial magnets. I wish to make this distinction, as permanent magnets would not respond to the conditions imposed upon them, as the actions of the magnets must vary with the variations of their energizing sources.

It will be noticed that the magnets in the field-circuit of the exciter and the magnet in the working circuit do not rely upon the difference in voltages in these two circuits, but upon the difference in intensities of the currents in the two circuits. These magnets are consequently wound with a small number of turns of heavy or coarse wire in contradistinction to the high-resistance coils composed of a great number of turns of fine wire, which would have to be used were the voltages of these two circuits relied upon to operate the regulating devices. This is an advantage, because the voltage in the field of the exciter may run exceedingly low, as this fact will not at all interfere with the operation of the magnet in series therewith, composed of a few turns of coarse wire, which magnet is fully responsive to the intensity of the current in said circuit, but practically insensible to the voltage therein.

Having thus described the invention, what is claimed as new, and desired to be secured by Letters Patent, is—

1. A voltage-regulator for a dynamo comprising the combination with an alternator and its exciter, a variable resistance and a shunt resistance interposed in the field-circuit of the exciter, two main artificial magnets one of which is connected in series with the field of the exciter and the other in the series with the working circuit of the alternator, and mechanical connections whereby the said artificial magnets operate the said variable resistance in response to the varying intensities of the exciter field-current and the current of the working circuit of the said alternator; substantially as described.

2. A voltage-regulator comprising the combination with an alternating dynamo and its exciter, a shunt resistance and a variable resistance in the field-circuit of the exciter, two main artificial magnets for controlling said variable resistance, one of which is in series with the exciter-field and the other in series with the working circuit of the said alternating dynamo, mechanical connections between the said artificial magnets and the said variable resistance, and elastic means for initially adjusting the effectiveness of the said variable resistance; substantially as described.

3. A dynamo-regulator comprising the combination with an alternator and exciter, a shunt resistance and a variable resistance in the field-circuit of the exciter, a main artificial magnet in series with and arranged to increase the said variable resistance by the incremental action of the exciter field-current, a second main artificial magnet in series with and arranged to decrease the said variable resistance by the incremental action of the current in the working circuit of the said alternator, an elastic means for initially adjusting the effectiveness of the said variable resistance, an auxiliary artificial magnet energized by the voltage of the working circuit of the said alternator, and mechanically-connected means whereby the said auxiliary artificial magnet is made to assist the first-mentioned main artificial magnet that is energized by the exciter field-current; substantially as described.

4. In an apparatus for regulating field-circuits of separately-excited electric generators, the combination of a shunt and a variable resistance in the exciter field-circuit, an artificial magnet also in said exciter field-circuit, and an opposing artificial magnet in the system or work-circuit whereby said variable resistance may be varied by the differential magnetic forces in opposition to each other, which are derived from the currents flowing in said circuits respectively; substantially as described.

5. In an apparatus of the character described, the combination of a variable resistance in the field-circuit of an auxiliary exciting-generator, an artificial magnet also in said field-circuit of the said auxiliary generator whose energy is exerted to increase said resistance, and an opposing artificial magnet in the work-circuit or system whose energy is exerted in opposition to the first-mentioned artificial magnet to reduce said resistance; substantially as described.

6. In an apparatus of the character described, the combination of a shunt resistance in the field-circuit of an auxiliary exciting-dynamo, a local circuit around said shunt resistance, a variable resistance in said local circuit, an artificial magnet which is energized by the field-circuit of the auxiliary exciting-dynamo, which magnet tends to increase the variable resistance and shunt the field-current through the shunt resistance, and an opposing artificial magnet energized proportional to the current in the work-circuit which tends to close said local circuit; substantially as described.

7. In an apparatus of the character described, the combination of a shunt resistance in the exciter field-circuit, a local circuit around said shunt resistance, a variable resistance in said local circuit, an artificial magnet also in said exciter field-circuit which tends to increase said variable resistance and shunt the current of the field-circuit through the shunt resistance, an opposing artificial magnet in the work-circuit tending to reduce said variable resistance, and a supplemental artificial magnet energized by the voltage of the work-circuit for assisting the artificial magnet in the exciter field-circuit; substantially as described.

8. In an apparatus of the character described, the combination of a generator and an auxiliary exciter field-circuit, an artificial magnet arranged in said auxiliary exciter circuit-field, a resistance in said auxiliary field-circuit, said artificial magnet when energized tending to increase said resistance, a spring in opposition to said magnet tending to decrease said resistance, an artificial magnet energized by the voltage of the system or work-circuit for opposing said spring and assisting said first-mentioned artificial magnet, and another artificial magnet arranged in series with the work-circuit for opposing the two magnets above mentioned and assisting said spring to reduce said variable resistance; substantially as described.

9. In an apparatus of the character described, the combination of guide-rods, bars adjustably mounted on said guide-rods, artificial magnets 1 adjustably mounted on one of said bars, an armature mounted on the other of said bars, a movable contact carried by said armature, and a stationary contact with which said movable contact coöperates; substantially as described.

10. In an apparatus of the character described, the combination of guide-rods, bars adjustably mounted on said guide-rods, artificial magnets 1 adjustably mounted on the lowermost bar, an armature pivotally mounted on the bar arranged above said artificial magnets, a contact carried by said pivoted armature, a stationary contact carried by said bar with which the movable contact coöperates, a solenoid-magnet adjustably mounted on said bars, and a mechanical yielding connection between the core of said magnet and said pivoted contact-carrying armature; substantially as described.

11. In an apparatus of the character described, the combination of a pivoted armature, a contact carried by said armature, a stationary contact with which said movable contact coöperates, an artificial magnet which when energized tends to separate said contacts, a solenoid-magnet whose core is connected to said pivoted armature whereby when said solenoid-magnet is energized it tends to close said contacts, and a second solenoid-magnet in axial alinement and above the first-mentioned solenoid-magnet whose core is also connected to the core of the first-mentioned artificial magnet; substantially as described.

12. In an apparatus of the character described, the combination of a suitable casing, guide-rods arranged in said casing, magnets 1 adjustably mounted upon and near the lower ends of said guide-rods, a pivoted armature with which said magnets coöperate and adjustably mounted on said guide-rods and above said magnets, a movable contact carried by said pivoted armature, a stationary contact with which said movable contact coöperates, said stationary contact being also supported by said guide-rods, two solenoid-magnets arranged in axial alinement and adjustably mounted upon said guide-rods, the cores of said solenoid-magnets being connected together and to said pivoted armature, a spring connected to said cores, and means for regulating the tension of said springs; substantially as described.

13. The improvement in the art of regulating an alternating-current generator, the field of which is energized by an exciter, comprising means for regulating the field resistance of the exciter in response to differential electromagnetic forces resulting from placing the intensity of the field-current of the exciter, in magnetic opposition to the intensity of the current output of the said alternating-current generator; substantially as described.

14. The improvement in the art of regulating the field of an alternating-current generator, the field of which is energized by an exciter, comprising a variable resistance in series with the field of the exciter, and means for controlling the said variable resistance in response to differential electromagnetic forces resulting from placing the intensity of the field-current of the exciter in magnetic opposition to the intensity of the current output of the said alternating-current generator, and supplying a shunt resistance having a negative temperature coefficient to relieve the said variable resistance; substantially as described.

15. The improvement in the art of regulating an alternating-current generator, the field of which is energized by an exciter, comprising means for regulating the field resistance of the exciter in response to differential electromagnetic forces resulting from the intensity of the field-current of the exciter working in magnetic opposition to the intensity of the current output of the alternating-current generator, and supplementary means, whereby, the voltage of the current output of the said alternating-current generator magnetically assists the action of the field-current of the said exciter; substantially as described.

16. The improvement in the art of regulating the field of an alternating-current generator, the field of which is energized by an exciter, comprising a variable resistance in the field-circuit of the exciter, means for controlling the effectiveness of the said variable resistance by differential electromagnetic forces resulting from magnetic opposition of the intensity of the field-current of the exciter against the intensity of the current output of the alternating-current generator, supplementary electromagnetic means, whereby, the voltage of the current output of the said alternating-current generator is made to magnetically assist the action obtained from the intensity of the field-current of the exciter, and shunt resistances having negative temperature coefficiencies to relieve the said variable resistance; substantially as described.

17. The combination of an alternator, an exciter therefor, and means for regulating the field resistance of the exciter in response to differential electromagnetic forces resulting from the intensity of the exciter field-current working in electromagnetic opposition to the intensity of the current output of the said alternator; substantially as described.

18. The combination of an alternator, and its exciter, a variable resistance in series with the field of the exciter, the said resistance being responsive to the action of two magnets, one of which is in circuit with the exciter-field, and the other in the work-circuit of the said alternator, and means for assisting the first-mentioned magnet by the voltage of the said alternator, the second-mentioned magnet being assisted by mechanically yielding means; substantially as described.

19. The combination of a dynamo-electric machine, an exciter therefor, means for regulating the field resistance of the exciter in response both to the intensity of the exciter field-current and the intensity of the current output of the alternator, the intensities of the two currents being in electromagnetic opposition to each other, and means whereby the voltage of the alternator is made to assist the action obtained from the intensity of the exciter field-current; substantially as described.

20. The combination of a dynamo-electric machine, an exciter therefor, a variable resistance in the field-circuit of the exciter, two magnets for operating the said variable resistance, one of which is in series with the field of the exciter and the other in series with the work-circuit of the said dynamo-electric machine, supplementary electromagnetic means whereby the voltage of the current in the said work-circuit is made to assist the first-mentioned magnet, and a shunt having a resistance with a negative temperature coefficient connected across the said variable resistance; substantially as described.

In testimony whereof I hereunto affix my signature, in the presence of two witnesses, this 26th day of July, 1905.

GEORGE S. NEELEY.

Witnesses:
F. R. CORNWALL,
GEORGE BAKEWELL.